United States Patent

[11] 3,571,524

[72] Inventors Isao Kozu;
Akio Nishiyama; Yukitada Ayukawa;
Takao Orita, Osaka, Japan

[21] Appl. No. 738,057
[22] Filed June 18, 1968
[45] Patented Mar. 16, 1971
[73] Assignee Matsushita Electric Industrial Co., Ltd
Kadoma, Osaka, Japan
[32] Priority June 30, 1967
[33] Japan
[31] 42/42720

[54] MAGNETIC RECORDING AND REPRODUCING APPARATUS WITH MEANS TO MECHANICALLY MEMORIZE A LENGTH OF TAPE
9 Claims, 9 Drawing Figs.

[52] U.S. Cl. .......... 179/100.2, 35/35
[51] Int. Cl. .......... G11b 15/02 G11b 15/20, G09h 5/04
[50] Field of Search .......... 179/100.2; 35/35.3

[56] References Cited
UNITED STATES PATENTS

| | | | |
|---|---|---|---|
| 3,280,271 | 10/1966 | Meyer .......... | 35/35.3 |
| 3,234,666 | 2/1966 | Cooper .......... | 179/100.2 |
| 3,176,927 | 4/1965 | Irazoqui .......... | 35/35.3 |

*Primary Examiner*—J. Russell Goudeau
*Attorney*—Wenderoth, Lind and Ponack

ABSTRACT: A magnetic recording and reproducing apparatus. The apparatus has tape-moving means including a tape drive capstan, a pinch roller, a takeup reel roller, and a supply reel roller, and has magnetic heads for recording and or reproducing signals on said tape. Memory means is provided for mechanically memorizing a length which the tape has moved. Driving means causes switch means to change said magnetic heads from the reproducing condition to the recording condition, and simultaneously engages said memory means with one of said reel rollers. Rewind means drives said supply reel roller to rewind said tape after the recording is completed and is moved out of engagement with said supply reel roller when the length of said tape that has been memorized by said memory means has been rewound.

INVENTORS
ISAO KOZU
AKIO NISHIYAMA
YUKITADA AYUKAWA
TAKAO ORITA
BY
Wenderoth, Lind & Ponack
ATTORNEYS INVENTORS
ISAO KOZU
AKIO NISHIYAMA
YUKITADA AYUKAWA
TAKAO ORITA
BY
Wenderoth, Lind & Ponack
ATTORNEYS

Patented March 16, 1971 3,571,524

3 Sheets-Sheet 3

INVENTORS
ISAO KOZU
AKIO NISHIYAMA
YUKITADA AYUKAWA
TAKAO ORITA
BY
Wenderoth, Lind & Ponack
ATTORNEYS

MAGNETIC RECORDING AND REPRODUCING APPARATUS WITH MEANS TO MECHANICALLY MEMORIZE A LENGTH OF TAPE

This invention relates to magnetic recording and reproducing apparatus, and more particularly to such an apparatus which can memorize a length of a tape on which material has been recorded and quickly rewind said length of the tape and reproduce the material immediately.

In linguistic studies using a conventional tape recorder now available in the market, a student must carry out a complicated operation before he can listen to what has been recorded. It is quite difficult to find the point at which a desired recording has been started. This is an obstacle to linguistic studies. In order to promote the efficiency of linguistic studies, it is desirable to have the recorded voice reproduced immediately. In addition it is desirable to make the apparatus simple and easy for a student to handle. So far, there has been in use for the above purpose an apparatus in which an electric control signal on the tape is used for the detection of the point where the desired recording was started during rapid rewind drive of the tape. But this apparatus is liable to cause poor contact between magnetic heads and the tape due to the fluttering of the tape during quick rewind and there is difficulty in reliably picking up the control signal. Consequently, the apparatus is not completely reliable for rewinding the length of tape which one wants to reproduce.

The general object of the present invention is to provide a magnetic recording and reproducing apparatus capable of memorizing mechanically a length of tape on which a desired amount of voice is recorded, rewinding said length of tape automatically and quickly and automatically reproducing what is on the tape.

Another object of this invention is to provide a magnetic recording and reproducing apparatus characterized by memory means which mechanically memorizes a length which the tape has moved and actuates rewind means to rewind the same exact length of the tape.

A further object of the invention is to provide a magnetic recording and reproducing apparatus in which a voice causes the apparatus to record and initiates operation of a memory means for memorizing a length of the tape which has moved, which length of the tape is played back after quick rewind of the tape when the operator stops speaking.

In order to achieve these objects there is provided an apparatus comprising tape-moving means, magnetic heads, memory means for mechanically memorizing a length which the tape has moved, driving means which is capable of causing switch means to change said magnetic heads from a reproducing condition to a recording condition, and simultaneously engaging said memory means with one of reel rollers, and rewind means which drives a supply reel roller to rewind the tape after the recording is completed and which is moved out of engagement with said supply reel roller when the length of tape is rewound which has been memorized by said memory means.

Further objects and advantages will become more apparent from the following detailed description taken in connection with the accompanying drawings in which.

Figure 1:
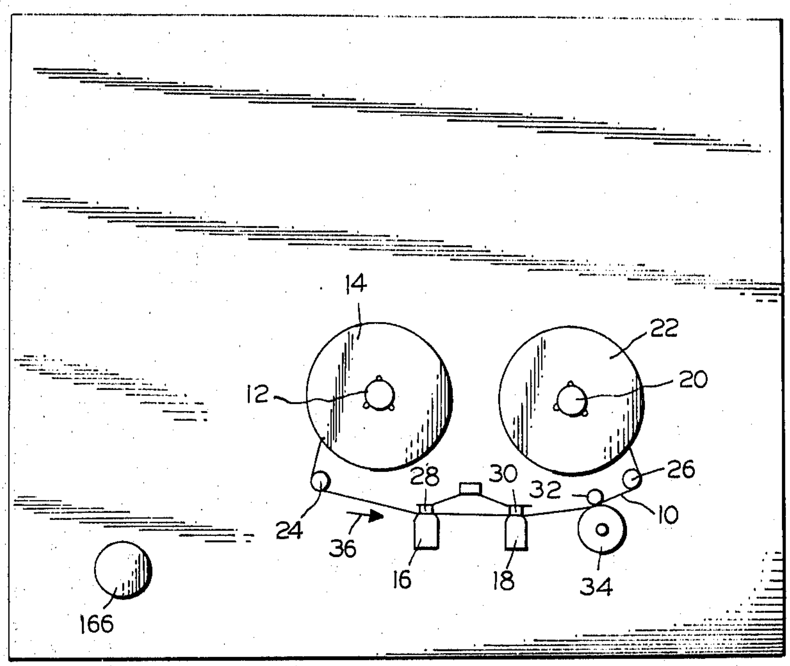
FIG 1 is a top plan view of one embodiment of the recording and reproducing apparatus of the present invention.

Referring to FIG. 1, a magnetic tape 10 is wound on a takeup reel 22 mounted on a takeup reel roller 20 from a supply reel 14 mounted on a supply reel roller 12 through an erase head 16 and a magnetic record-playback head 18. The tape 10 is guided by guide pins 24 and 26 to move along a predetermined path, and is pressed against said heads 16 and 18 by pads 28 and 30, respectively. Where it is pinched between a capstan 32 and a pinch roller 34, said tape 10 is fed so as to move at a predetermined speed in the direction designated by arrow 36.

Figure 2:
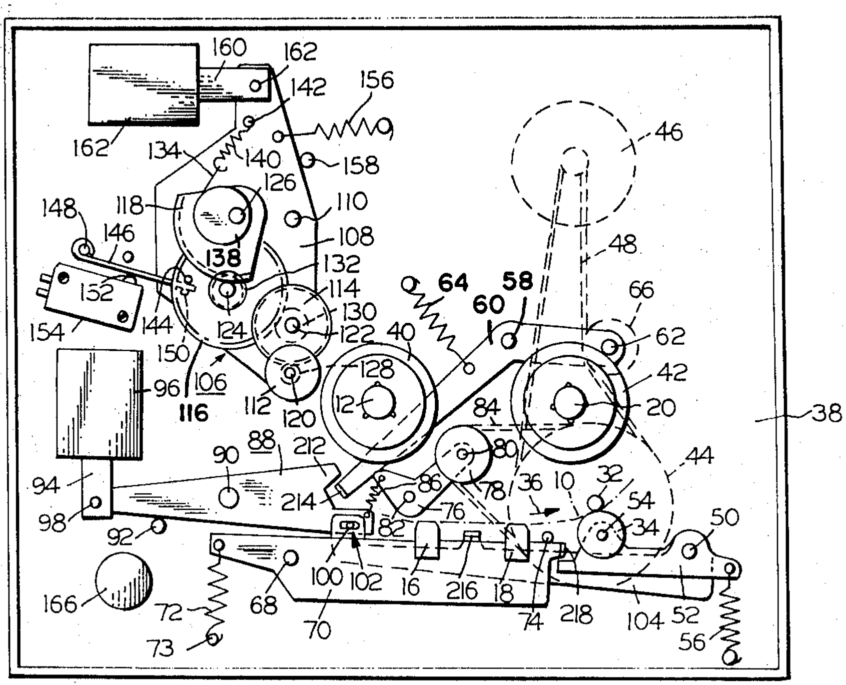
FIG. 2 is a top plan view of the apparatus of FIG. 1 with an upper panel removed for clarity.

Referring to FIG. 2, where in the tape-moving means is shown more fully, said reel rollers 12 and 20 are rotatably mounted on a chassis 38, and have rubber tires 40 and 42 around the respective circumferences thereof.

FIG. 2 shows the apparatus of the invention with the parts in positions in which the tape moving means is moving the tape 10 at a playing speed. Suitable means from in the prior art is used as operating means for moving the parts of said tape moving means to the playing position. Said operating means is not an important constituent of the apparatus of the invention. Therefore the detailed description thereof has been omitted.

Said capstan 32 has a flywheel 44 coaxially secured thereto which is rotatably mounted on the chassis 38 by a suitable bearing, now shown, and is rotated counterclockwise by a motor 46 through a belt 48.

Said pinch roller 34 is rotatably mounted on a shaft 54 in turn mounted on a pinch roller arm 52 which is pivotally mounted on a shaft 50 fixedly secured on the chassis 38.

A spring 56 is connected to one end of the arm 52 biasing it in a clockwise direction in FIG. 2, so that the pinch roller 34 pressed the tape 10 against the capstan 32. Therefore, the tape 10 is moved in the direction of arrow 36 by the rotation of the capstan 32.

A drive roller 62 is rotatably mounted at one end of a drive roller lever 60 which is pivotally mounted on a shaft 58 secured on the chassis 38. The lever 60 is biased to swing about the shaft 58 by a spring 64 connected thereto so as to press the drive roller 62 against the tire 42 on the takeup reel roller 20.

A friction roller 66 is coaxially connected to the drive roller 62 by a friction coupling so as to rotate with drive roller 62 while proper slip can occur between them. The friction roller 66 is engaged with the belt 48 which extends between the motor 46 and the flywheel 44, and rotates clockwise with the rotation of the motor 46. Thus said drive roller 62 is rotated in the same direction by the friction roller 66 through the friction coupling so as to drive the takeup reel roller 20 in a counterclockwise direction.

The tape 10 which is drawn off supply reel 14 by the capstan 32 and the pinch roller 34 is taken up on the takeup reel 22.

The erase head 16 and the record-playback head 18 are fixed on a head plate 70 which is pivotally mounted on a shaft 68 mounted on the chassis 38. The head plate 70 is biased counterclockwise in FIG. 2 by a spring 72 which is connected between one end of said head plate 70 and a pin 73 on the chassis 38. The counterclockwise rotation of the plate 70 is limited by a stop pin 74 against which the other end of the plate 70 abuts in the playing position as shown in FIG. 2.

There will now be described the structure of rewind means for rewinding the tape quickly.

A rewind lever 76 is pivotally mounted on a shaft 82 on the chassis 38. A rewind roller 78 is rotatably mounted on a shaft 80 which is mounted at one end of the rewind lever 76, and is rotated counterclockwise by a belt 84 which runs between the roller 78 and the flywheel 44.

The rewind lever 76 is biased so as to swing counterclockwise by a spring 86 which is connected between the lever 76 and an actuating lever 88. Said actuating lever 88 is pivotally mounted on a shaft 90 on the chassis 38. When the actuating lever 88 is located at the position illustrated in FIG.

2, the tension of the spring 86 is not large enough to stretch the belt 84. Therefore, the rewind roller 78 does not come in contact with the rubber tire 40 of the supply reel roller 12. Accordingly a gap exists between the rewind roller 78 and the supply reel roller 12, and the rotational force of the motor 46 is not transmitted to the supply reel roller 12.

The counterclockwise rotation of the actuating lever 88 is regulated by a stop pin 92. One end of the lever 88 is connected by a pin 98 with a plunger 94 of a second solenoid 96. A pin 100 which is fixed on the other end of the lever 88 is inserted in a slot 102 formed at the end of a releasing lever 104. Said lever 104 is pivotally mounted on the shaft 50, and is able to swing in association with the actuating lever 88.

An explanation will be given of the means for memorizing mechanically the length which the tape has moved.

Figure 3:
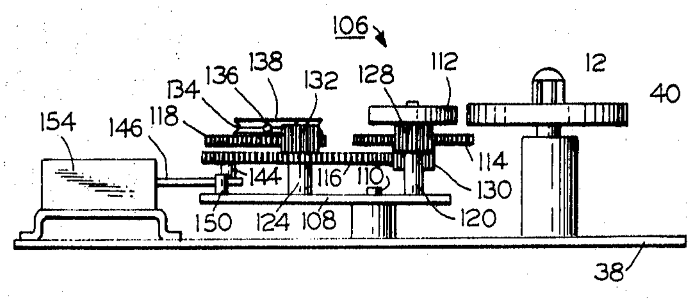
FIG. 3 is a fragmentary elevational view of the memory means of the apparatus according to the invention.

With reference to FIG. 2 and FIG. 3, a rotatable device 106 is assembled on a base plate 108 which is pivotally mounted on a shaft 110 on the chassis 38. Said rotatably device 106 includes a contact roller 112, a gearwheel 114, a memory disc 116 provided with gear teeth on the circumference thereof, and a sector gear 118. These are rotatably mounted on respective shafts 120, 122, 124 and 126 which are mounted on the base plate 108. A small gear 128 coaxial with and secured to the contact roller 112 is meshed with the gearwheel 114, and further a small gear 130 coaxial with and secured to said wheel 114 is meshed with the memory disc 116, and a still further small gear 132 coaxial with and secured to said memory disc 116 is meshed with the sector gear 118. A rope 134 is wound around an annular groove of an eccentric wheel 138 which is secured to the sector gear 118, and one end of the rope 134 is fixed to a pin 136 secured to the wheel 138 and the other end thereof is fastened to a spring 140 which is anchored at a fixed pin 142 on the base plate 108. Therefore, the memory disc 116 is biased for rotation counterclockwise by the spring 140 through the sector gear 118.

This rotation is limited by engagement of a memory pin 144 which is fixed to the lower surface of the disc 116 with a stop pin 150 on the base plate 108 while a tip of a switch arm 146 is pinched between said memory pin 144 and said stop pin 150.

Said switch arm 146 is rotatably mounted on a shaft 148 on the chassis 38, and engages a button 152 of a microswitch 154 which acts as a detecting switch, when said tip of a switch arm 146 is pinched. Consequently the switch 154 is moved to the off position. The base plate 108 is biased so as to rotate clockwise about the shaft 110 by a spring 156, but its rotation is limited by a stop pin 158. In the positions of the parts as illustrated in FIG. 2, the contact roller 112 is out of engagement with the supply reel roller 12.

Figure 4:
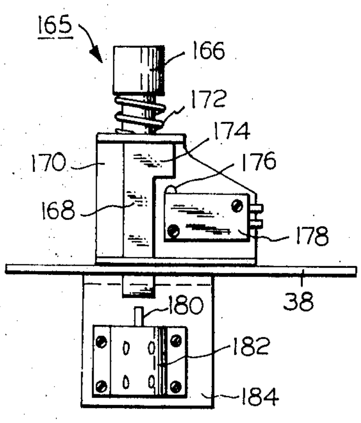
FIG. 4 is a fragmentary elevational view of an operating device forming part of the apparatus of the invention.
Figure 7:
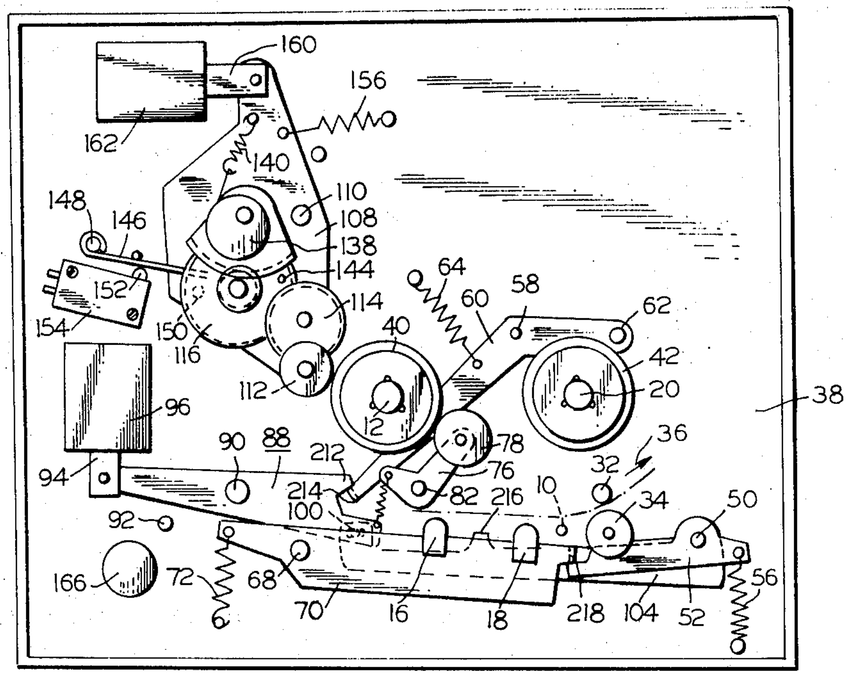
FIG. 7 is a top plan view, similar to FIG. 2, showing the apparatus in its rewinding condition.

With reference to FIG. 2, FIG. 4, and FIG. 7, there will be hereinafter explained the structure of driving means for driving said memory means.

Referring to FIG. 4, there is shown an operating device 165 mounted on the chassis 38. A pushbutton 166 is fixed to an upper end of a key 168 which is slidably supported by a supporting plate 170 secured on the chassis 38. Said button 166 is usually raised upward by a compression spring 172. When the pushbutton 166 is depressed, a projection 174 of the key 168 pushes a button 176 of a two way microswitch 178 which is secured to the supporting plate 170, and at the same time the lower end of the key 168 pushes down an actuator 180 of a slide switch 182 which is fixed to a plate 184 secured to the lower surface of the chassis 38. When said actuator 180 of the slide switch 182 is pushed down, the electric amplifier of the apparatus of the present invention is changed from the reproducing state to the recording state.

Referring again to FIG. 2, one end of the base plate 108 is connected with a plunger 160 of a first solenoid 162 by a pin 164.

Figure 8:
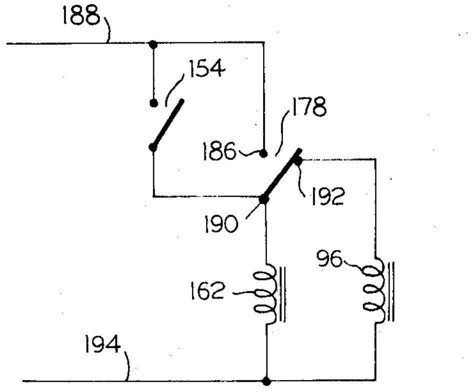
FIG. 8 is a diagrammatic illustration of electrical control circuits used in the apparatus of the invention.

Referring now to FIG. 8 which shows a control circuit for operating the above described structure, one contact of the switch 154 and a normally open contact 186 of the switch 178 are connected by a lead 188. The other contact of the switch 154 and a common contact 190 are connected with the first solenoid 162. A normally closed contact 192 of the switch 178 is connected with the second solenoid 96. Said solenoids 96 and 162 are also connected by a lead 194. Said leads 188 and 194 are connected with a source of DC power.

Figure 5:
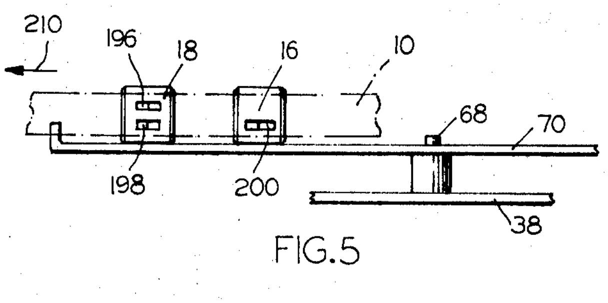
FIG. 5 is a fragmentary elevational view showing the alignment of magnetic heads used in the apparatus of the invention.
Figure 6:
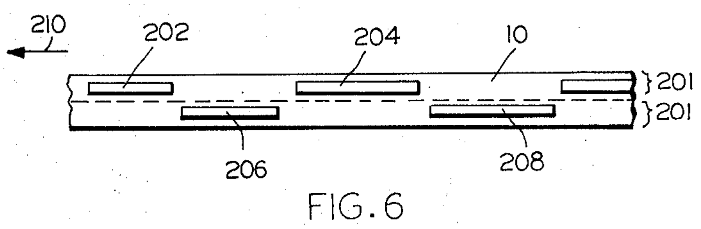
FIG. 6 is a fragmentary elevational view of a tape used in the apparatus of the invention.

The playback head 18 has two head tips 196 and 198 as shown in FIG. 5, and the erase head 16 has one head tip 200 which is at the same level as said head tip 198. The tape 10 which is used in this apparatus has, for example, two recording tracks 201 and 203 as shown in FIG. 6. On the upper track 201, the instructor's questions have already been recorded as phonetic signals 202, 204 and so on, spaced properly from each other. These can be played back by the upper head tip 196 of the head 18. Said head tip 196 is connected with an electric amplifier which is always in a playback state.

On the lower track 203 of the tape 10 can be recorded the student's answers as phonetic signals 206, 208 and so on, while the recorded signals which have been recorded previously are being erased.

In operation, as shown in FIG. 1, the tape 10 is moving in the direction of the arrow 36 at a predetermined speed (in FIG. 5 and FIG. 6 the tape is moving in the direction of the arrow 210).

After hearing the instructor's questions on the tape the student depresses the pushbutton 166 in FIG. 4. The depression causes the slide switch 182 to switch the electric amplifier connected with the head tips 198 and 200 from the reproducing state to the recording state. At the same time, the microswitch 178 has the common contact 190 connected with the normally opened contact 186 so as to energize the first solenoid 162 in FIG. 8. Referring to FIG. 2, upon energization of the solenoid 162 the plunger 160 is moved towards the left to swing the base plate 108 counterclockwise about the shaft 110. AS a result the contact roller 112 is pressed against the outer periphery of the rubber tire 40 on the supply reel roller 12.

With the tape moving in the direction of the arrow 36, the supply reel roller 12 is rotating counterclockwise. Therefore the contact roller 112 starts to rotate clockwise so that the memory pin 144 moves away from the switch arm 146. This allows the switch arm 146 to swing counterclockwise, and the button 152 of the microswitch 154 moves out, being spring biased. The switch 154 in FIG. 8 is closed at this time.

When the student speaks his answer into a microphone, his voice is recorded on the tape 10 as phonetic signal 206 in FIG. 6.

With the parts in the positions described above, the memory disc 116 continues its rotation corresponding to the tape moving.

When the student removes his finger from the pushbutton 166 after he has finished speaking his answer, the pushbutton 166 moves upward and the slide switch 182 changes the head tips 198 and 200 from the recording state to the reproducing state. Upon restoration of the pushbutton 166, the button 176 of the microswitch is biased back to its normal position and the common contact 190 is connected with the normally closed contact 192 as shown in FIG. 8. As previously described, the microswitch 154 has already been closed so that both the solenoids 96 and 162 are supplied with electric power.

Upon energization of the solenoid 96, the plunger 94 thereof is actuated to swing the actuating lever 88 clockwise as shown in FIG. 7. A projection 212 on the lever 88 pushes a bent over tab 214 on the drive roller lever 60 so as to swing the lever 60 counterclockwise. As a result the drive roller 62 is moved away from the rubber tire 42 on the takeup reel roller 20. On the other hand the pin 100 on the lever 88 drives the releasing lever 104 counterclockwise about the shaft 50. A bent over tab 216 on said releasing lever 104 pushes the head plate 70 clockwise about the shaft 68 so that the heads 16 and 18 are separated from the tape 10. Further a bent over tab 218 at the right hand end of the head plate 70 pushes the pinch roller arm 52 counterclockwise so as to separate the pinch roller 34 from the capstan 32. On the other hand the clockwise rotation of the actuating lever 88 extends the spring 86. In response to an increase in the tension of the spring 86 the rewind lever 76 swings counterclockwise and the rewind roller 78 is pressed against the rubber tire 40 of the supply reel roller 12. As mentioned above the rewind roller 78 is rotated counterclockwise by the belt 84.

Consequently, the supply reel roller 12 rotates clockwise and pulls the tape 10 at a rapid speed in the direction opposite to the arrow 36 so as to rewind the tape 10 on the supply reel 14.

This rotation of the supply reel roller 12 makes the contact roller 112 rotate counterclockwise, and also makes the memory disc 116 rotate counterclockwise. As long as there is no slip between the rubber tire 40 of the supply reel roller 12 and the contact roller 112, the tape 10 will be rewound to the point where the desired recording is started as soon as the memory pin 144 just reaches the stop pin 150. At this time the memory pin 144 pushes the switch arm 146 against the stop pin 150 so that said arm 146 depresses the button 152 of the microswitch 154. The switch 154 in FIG. 7 is opened to break the circuit to the solenoids 96 and 162 at the same time.

As shown in FIG. 2, the base plate 108 swings clockwise about the shaft 110 under the biasing force of the spring 156 so as to separate the contact roller 112 from the rubber tire 40 on the supply reel roller 12. Further, the actuating lever 88 swings counterclockwise under the biasing force of the spring 86 so as to separate the rewind roller 78 from said rubber tire 40. At the same time the drive roller lever 60 swings clockwise under the biasing force of the spring 64 so as to engage the drive roller 62 with the rubber tire 42 of the takeup reel roller 20. Further, the head plate 70 swings counterclockwise under the biasing force of the spring 72 so as to contact the heads 16 and 18 with the tape 10. Still further, the pinch roller arm 52 swings clockwise under the biasing force of the spring 56 so as to press the pinch roller 34 against the capstan 32. Consequently, the tape 10 moves at a predetermined speed in the direction of the arrow 36, and the phonetic signal 206 (in FIG. 6) which the student has recorded is played from the beginning thereof.

On hearing the tutor's questions the student can record his answers in the manner described above. A soon as recording is finished, the tape is rewound automatically to the point where the desired recording is started and the answer that the student gave is played back.

By making the rewinding speed of the tape 20 to 30 times larger than the recording or reproducing speed of the tape, the rewinding is achieved substantially instantaneously, especially when the answers recorded are short. As soon as the student has his voice recorded on the tape, what the student has spoken is played back.

When the student wants to hear the instructor's signal 202 in FIG. 6 once more, the student has only to press the pushbutton 166 as soon as reproducing of the signal 202 has begun. From that point the memory means starts its operation. After the student has recorded his voice and removed his finger from the pushbutton 166, the tape is instantly rewound up to the beginning point of the tutor's signal 202 and playback will start therefrom. Therefore the student can hear his voice as well as the instructor's voice, and compare them with each other.

One of the features of the structure of the apparatus of this invention is that the supply reel roller 12, the contact roller 112, and the pivot pin 110 for the base plate 108 are so aligned that the contact roller 112 is forcedly pressed against the rubber tire 40 of the supply reel roller 12 in the operating condition of the memory device.

The reason why the contact roller 112 is forcedly pressed against the supply reel roller 12 will be explained more clearly. Referring to FIG. 7, the larger angle formed between a line connecting the center of the supply reel roller 12 and the center of the contact roller 112 and a line connecting the center of the contact roller 112 and the shaft 110 is about 120°. When said contact roller 112 stops its rotation, the supply reel roller 12 still continues its clockwise rotation so that the frictional force between said contact roller 112 and the supply reel roller 12 causes the plate 108 to rotate counterclockwise about the pin 110 in such a way that the contact roller 112 is forcedly pressed against the supply reel roller 12. Accordingly, when the memory pin 144 pushes the switch arm 146 against the stop pin 150 and counterclockwise rotation of the memory disc 116 is stopped, the contact roller 112 is forcedly pressed against the rubber tire 40 on the supply reel roller 12 so as to brake said roller 12 positively.

Therefore, said roller 12 never overrotates and the tape is rewound correctly to the point where the operation of the memory means is started.

Another feature of this invention is that the torque necessary for rotating the contact roller 112 is substantially constant.

Referring to FIG. 2, the spring 140 is connected with the eccentric wheel 138 through the rope 134 so that the increasing tension of the spring 140 is compensated by the decreasing moment arm of the eccentric wheel 138.

Consequently, the torque to rotate the contact roller 112 clockwise is a substantially constant value which prevents flutter and change of the tape speed.

The apparatus can be easily modified so as to be a voice operated system. One way in which this can be achieved is by a construction in which the key 168 in FIG. 4 is pulled downward by an appropriate magnetic solenoid (not shown). This solenoid can be energized by a commonly used suitable electric circuit which is operated by a voice.

Figure 9:
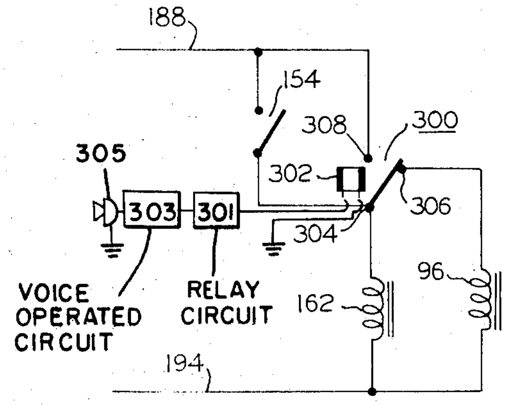
FIG. 9 is a diagrammatic illustration of electrical control circuits, similar to FIG 8, showing another embodiment thereof used in the present invention.

Another modification which is possible is one in which head tips 198 and 200 (in FIG. 5) remain in a recording position and a coil 302 of a relay 300, shown in FIG. 9, remains energized by means of a relay circuit 301 which is controlled by a voice operated circuit 303 during the time when the operator is speaking. FIG. 9 shows an electrical control circuit in which the switch 178 in FIG. 8 is replaced by the relay 300. When the electric current is supplied to the coil 302, a common contact 304 is switched to a contact 308 from a contact 306. Then the first solenoid 162 engages the memory means with the supply reel roller 12 as soon as the student speaks into the microphone 305.

By using such a modified apparatus, the student can listen to his own voice immediately after recording without any manual operation. This brings more efficiency to linguistic studies.

It is apparent that various modifications may be made without departing from the invention. The above described specific examples are intended merely to illustrate the various facets in certain selective embodiments of the invention, the scope of which it is intended shall be limited only by the following claims.

We claim:

1. A magnetic recording and reproducing apparatus comprising:

tape-moving means including a tape drive capstan, a pinch roller, a takeup reel roller, a supply reel roller, and drive means coupled to said capstan and takeup reel roller;

magnetic heads for recording material on and reproducing material from magnetic tape;

memory means for mechanically memorizing a length of tape which has moved past a given point;

rewind means coupled to said drive means for driving said supply reel roller to rewind said tape after the recording is completed; and actuating means coupled to said magnetic heads, said memory means and said rewind means for changing said heads from a reproducing state to a recording state and simultaneously engaging said memory means with one of said reel rollers and causing movement of said rewind means out of engagement with said supply reel roller when the length of said tape which is rewound is the same as has been memorized by said memory means.

2. A magnetic recording and reproducing apparatus as claimed in claim 1, wherein said memory means includes a rotatable device which is brought into engagement with one of said reel rollers by said actuating means and which rotates in association with the movement of the tape.

3. A magnetic recording and reproducing apparatus comprising:

tape-moving means including a tape drive capstan, a pinch roller, a takeup roller reel roller, a supply reel roller, and drive means coupled to said capstan and takeup reel roller;

magnetic heads for recording material on and reproducing material from said tape;

memory means rotatably mounted in said apparatus for mechanically memorizing a length of tape which has moved past a given point;

actuating means including a first solenoid and coupled to said memory means for rotating said memory means into engagement with one of said reel rollers, and an operating device coupled to said first solenoid for energizing said first solenoid and coupled to said magnetic heads to change said magnetic heads from a reproducing state to a recording state when said operating device is operated; and rewind means coupled to said drive means and movable toward and away from said supply reel roller to rewind said tape, a second solenoid coupled to said rewind means and controlled by said operating device to be energized as soon as said operating device is restored to its inoperative position for moving said rewind means into engagement with said supply reel roller, said memory device being coupled to said solenoids for deenergizing them when a length of tape is rewound which is the same length that has been memorized by said memory means.

4. A magnetic recording and reproducing apparatus comprising:

tape-moving means including a tape drive capstan, a pinch roller, a takeup reel roller, a supply reel roller, and drive means coupled to said capstan and takeup reel roller;

magnetic heads for recording material on and reproducing material from said tape;

memory means including a base plate pivotally mounted at a fixed point on said apparatus, a rotatable device on said base plate and which rotates in association with the movement of the tape when said device is engaged with one of said reel rollers, and a detecting switch engaged by said rotatable device for being switched by said rotatable device at the beginning of the rotation of said device;

actuating means including a first solenoid and coupled to said base plate for moving said base plate to engage said rotatable device with one of said reel rollers, and an operating device coupled to said first solenoid for energizing said first solenoid and coupled to said magnetic heads to change said magnetic heads from a reproducing state to a recording state when said operating device is operated; and rewind means including a rewind roller coupled to said drive means for rotating said supply reel roller to rewind the tape, an actuating lever coupled to said rewind roller and said magnetic heads and said pinch roller for engaging said rewind roller with said supply reel roller and separating said pinch roller and said magnetic heads from the tape, and a second solenoid coupled to said actuating lever and operated by said operating device to be energized by the motion of said operating device to its initial position so as to drive said actuating lever, and being coupled to said detecting switch so that the current thereto is interrupted by said detecting switch after said rotating device has been restored to its original position.

5. The magnetic recording and reproducing apparatus as claimed in claim 4, wherein said rotatable device includes a contact roller engageable with said supply reel rollers, a memory disc rotatably connected to said contact roller, and a memory pin fixed on said memory disc and engageable with said detecting switch for switching said detecting switch.

6. The magnetic recording and reproducing apparatus as claimed in claim 5, wherein said contact roller, said supply reel roller, and the pivot axis of said base plate are so aligned that said contact roller is to be forcedly pressed against said supply reel roller when said memory pin reaches its original position.

7. The magnetic recording and reproducing apparatus as claimed in claim 5, wherein a spring is connected to said memory disc to bias said disc to rotate in the direction opposite to the direction in which said memory disc rotates in the recording state.

8. The magnetic recording and reproducing apparatus as claimed in claim 7, wherein a sector gear is mounted on said memory disc, an eccentric wheel is mounted on said sector gear, and a rope is wound around said wheel, the free end of which is connected to said spring.

9. A magnetic recording and reproducing apparatus comprising:

tape-moving means including a tape drive capstan, a pinch roller, a takeup reel roller, a supply reel roller, and drive means coupled to said capstan and said takeup reel roller;

magnetic heads for recording material on and reproducing material from said tape;

magnetic head switching means for changing said magnetic heads from a reproducing state to a recording state;

memory means for mechanically memorizing a length of tape which has moved past a given point;

a first solenoid coupled to said memory means which when energized causes said memory means to engage with one of said reel rollers;

rewind means coupled to said drive means for driving said supply reel roller to rewind said tape;

a second solenoid coupled to said rewind means which when energized causes said rewind means to be driven; and a voice-actuated energizing means coupled to said magnetic-head-switching means for actuating said switching means during the time when an operator is speaking, and coupled to said solenoids for energizing said first solenoid at least during the time when an operator is speaking and for energizing said second solenoid after the operator stops speaking; said memory means being coupled to said solenoids for deenergizing them when a length of said tape is rewound which is the same as has been memorized by said memory means.